United States Patent [19]

Marquardt et al.

[11] Patent Number: 5,013,858

[45] Date of Patent: May 7, 1991

[54] STABLIZED POLYORGANOSILOXANES AND THEIR USE AS A POWER TRANSMISSION MEDIUM

[75] Inventors: Gerwig Marquardt, Odenthal; Peter Preiss, Wuppertal, both of Fed. Rep. of Germany

[73] Assignee: Bayer Aktiengesellschaft, Leverkusen, Fed. Rep. of Germany

[21] Appl. No.: 514,381

[22] Filed: Apr. 25, 1990

[30] Foreign Application Priority Data

May 9, 1989 [DE] Fed. Rep. of Germany ....... 3915066

[51] Int. Cl.$^5$ .............................................. C07F 7/08
[52] U.S. Cl. .................................. 556/401; 252/78.3; 252/400.31
[58] Field of Search ................... 556/401; 252/400.31, 252/78.3

[56] References Cited

U.S. PATENT DOCUMENTS

| | | | |
|---|---|---|---|
| 4,898,956 | 2/1990 | Hilty | 556/401 |
| 4,921,987 | 5/1990 | Hitze et al. | 556/401 |

FOREIGN PATENT DOCUMENTS

| | | | |
|---|---|---|---|
| 3611504 | 8/1987 | Fed. Rep. of Germany | 556/401 |
| 0777100 | 6/1957 | United Kingdom | 556/401 |

*Primary Examiner*—Paul F. Shaver
*Attorney, Agent, or Firm*—Sprung Horn Kramer & Woods

[57] ABSTRACT

A power transmission medium having improved resistance to oxidation and heat comprising polyorganosiloxanes and an effective amount of a mixture of anthraquinone compounds and methyl hydrogen siloxanes.

4 Claims, No Drawings

STABLIZED POLYORGANOSILOXANES AND THEIR USE AS A POWER TRANSMISSION MEDIUM

This invention relates to stabilized polyorganosiloxanes having improved resistance to oxidation and heat which may be used as a power transmission medium, for example, in electrical equipment, hydraulic systems, heat transfer plants, fluid couplings and fan couplings or torque converters.

The present invention is of particular importance for "encapsulated systems", for example for fluid couplings in which polyorganosiloxanes are used as power transmission media and, in this capacity, are exposed to high shear forces.

Under forces of this type, the media used undergo very considerable heating as a result of friction (in the presence of small quantities of atmospheric oxygen), unstabilized polyorganosiloxanes undergoing a considerable change in their properties after only a short time. Numerous processes for stabilizing polyorganosiloxanes can be found in the patent literature, but unfortunately most are attended by the disadvantage that they are only suitable for a given type of stressing. The described processes only provide stabilizing effects against oxidative thermal stressing or against purely thermal degradation.

Effective additives against oxidative effects which have hitherto been proposed include, for example, metal compounds of organic acids (U.S. Pat. No. 2,445,567), metal chelates (U.S. Pat. No. 2,465,296), ferrocene (DE-AS No. 116 396), cerium(III) diorganosiloxanolates (DE-PS No. 2 362 954) and $SiO_2$/carbonic acid derivatives (GB-A No. 1 409 476), while organotitanium, organozirconium and/or organohafnium compounds in combination with organosilicon hydrides (DE-OS No. 2 817 841) are said to be suitable for pure heat stabilization. With particular regard to the use of polyorganosiloxanes in fluid couplings, stabilizing processes have been described in which the systems are aftertreated with OH-active silicon compounds (EP No. 0 249 960), or are given additions of titanium, zirconium and hafnium components in combination with anilinophenoxy- or naphthylaminophenoxy-modified organosiloxanes (DE-OS No. 3 813 660) and of sulfur compounds (DE-OS No. 3 818 364).

In addition, it is known that special ketone compounds, including substituted anthraquinones, have a stabilizing effect on polyorganosiloxanes in electrical equipment (GB-A No. 780 622).

The problem addressed by the present invention was to stabilize polyorganosiloxanes in such a way that they undergo very little change in viscosity both under oxidative thermal stressing and under depolymerizing conditions. This problem was solved by incorporation in the polyorganosiloxanes of a combination consisting of 0.001 to 0.05% by weight substituted anthraquinone compounds (=component A), more especially those corresponding to the following formula

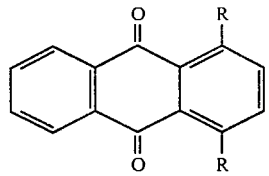

in which
R represents hydrogen, amino groups or substituted amino groups, such as for example alkylamino, alkenylamino or arylamino groups, and 0.05 to 5% by weight of a trimethylsilyl-terminated polymethyl hydrogen siloxane having a kinematic viscosity of 4 to 50 $mm^2 s^{-1}$ (=component B). If only one component is used, the stabilizing effects observed are only weak or not at all pronounced. The anthraquinone compound is preferably used in quantities of from 0.005 to 0.03% by weight and the polymethyl hydrogen siloxane in quantities of from 0.1 to 0.5% by weight.

Accordingly, the present invention relates to polyorganosiloxanes having improved resistance to oxidation and heat, characterized in that they contain substituted anthraquinone compounds and trimethylsilyl-terminated polymethyl hydrogen siloxanes.

More particularly, the invention relates to polyorganosiloxanes containing from 0.001 to 0.05% by weight, based on the total quantity, of anthraquinone compounds corresponding to the following general formula

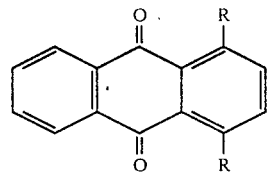

in which
the R's independently of one another represent hydrogen amino groups or substituted amino groups, and from 0.05 to 5% by weight of trimethylsilyl-terminated polymethyl hydrogen siloxanes.

Anthraquinone compounds are mainly used as dyes while polymethyl hydrogen siloxanes are used primarily as hydrophobicizing agents for various materials (textiles, gypsum, pigments, fire-extinguishing powders).

Preferred polyorganosiloxanes are linear or, optionally, even branched polymethyl siloxanes having a viscosity of 50 to 1,000,000 $mm^2 s^{-1}$ at 25° C. Polyorganosiloxanes containing organo groups, such as ethyl, vinyl, propyl, butyl, phenyl, or similar substituents may also be used.

Polyorganosiloxanes, preferably polydimethyl siloxanes, are widely produced by conventional processes and marketed as such. They are used, for example, as electrical insulating liquids, hydraulic media, hydrophobicizing agents, damping liquids, foam inhibitors, lubricants or heat transfer media.

The gel time of polyorganosiloxanes may be determined as a measure of their resistance to oxidation. The gel time is understood to be the time required to condition a sample in air at a certain temperature until it has been changed by oxidative processes to such an extent that it no longer flows under the effect of gravity.

A measure of the thermal stability of these systems is the change in viscosity which they undergo after a certain time at a certain temperature in a closed air-free system.

The following Examples are intended to illustrate the effectiveness of the combination according to the invention in polyorganosiloxanes.

EXAMPLE 1

Quantities of 0.01% by weight of the following anthraquinone compounds (Table 1) were stirred into a trimethylsilyl-terminated polydimethyl siloxane (PDMS) having a viscosity of 50 mm$^2$ s$^{-1}$ at 25° C.

TABLE 1

| Anthraquinone Compounds Used | |
|---|---|
| No. 1 | anthraquinone |
| No. 2 | 1-aminoanthraquinone |
| No. 3 | 1,4-diaminoanthraquinone |
| No. 4 | 1,4-bis-isobutylaminoanthraquinone |
| No. 5 | 1,4-bis-3-methyl-1-(2-phenylethyl)-butyl-aminoanthraquinone* |
| No. 6 | 1,4-bis-methylaminoanthraquinone* |
| No. 7 | 1,4-bis-(2-hydroxyethylamino)-anthraquinone* |
| No. 8 | 1-(3-dimethylaminopropylamino)-4-methylaminoanthraquinone |
| No. 9 | 1-amino-4-methylaminoanthraquinone* |
| No. 10 | 1-(4-methylphenylamino)-anthraquinone |
| No. 11 | 1,4-bis-(4-methylphenylamino)-anthraquinone* |
| No. 12 | 1,4-bis-(2,6-diethyl-4-methyl-phenylamino)-anthraquinone |
| No. 13 | 1,4-bis-(4-tert-butylphenylamino)-anthraquinone |
| No. 14 | 1,4-bis-(4-cyclohexylphenylamino)-anthraquinone* |
| No. 15 | 1-amino-4-phenylaminoanthraquinone* |
| No. 16 | 1-amino-4-cyclohexylaminoanthraquinone* |
| No. 17 | 1-methylamino-4-(3-methylphenylamino)-anthraquinone |
| No. 18 | 1-methylamino-4-(4-methylphenylamino)-anthraquinone |
| No. 19 | 1-(4-aminophenylamino)-1-methylaminoanthraquinone* |
| No. 20 | 1-(4-methoxyphenylamino)-4-methylamino)-anthraquinone* |
| No. 21 | 1-(3-dimethylaminopropylamino-4-(4-methylphenylamino))-anthraquinone |

*compound was only partly soluble

Since some of the compounds were not completely soluble in the silicone oil used, the samples in question were decanted off from the insoluble component and then tested for their oxidation stability as saturated solutions together with the samples of the soluble compounds of which the solubility limits were all in the range from about 0.2 to 0.005% by weight. The test was carried out in 50 ml glass beakers in which quantities of 20 g of the respective samples were heated to 225° C. until gelation occurred. The gel times determined are shown in Table 2.

TABLE 2

| Gel times of polydimethyl siloxane oils (PDMS) with additions of various anthraquinone compounds | |
|---|---|
| Addition | Gel Time (days) |
| No. 1 | 8–12 |
| No. 2 | 8–12 |
| No. 3 | 12–16 |
| No. 4 | 20–24 |
| No. 5 | 12–16 |
| No. 6 | 20–24 |
| No. 7 | 16–20 |
| No. 8 | 20–24 |
| No. 9 | 24–28 |
| No. 10 | 12–16 |
| No. 11 | 40–48 |
| No. 12 | 8–12 |

TABLE 2-continued

| Gel times of polydimethyl siloxane oils (PDMS) with additions of various anthraquinone compounds | |
|---|---|
| Addition | Gel Time (days) |
| No. 13 | 40–48 |
| No. 14 | 36–40 |
| No. 15 | 32–36 |
| No. 16 | 24–28 |
| No. 17 | 40–48 |
| No. 18 | 40–48 |
| No. 19 | 32–36 |
| No. 20 | 32–36 |
| No. 21 | 32–36 |
| PDMS, no addition | 8–12 |

EXAMPLE 2

0.1% by weight of a trimethylsilyl-terminated polymethyl hydrogen siloxane compound having a viscosity of 30 mm$^2$ s$^{-1}$ at 25° C. was stirred into the polydimethyl siloxane mentioned in Example 1 which was then tested for its oxidation stability by comparison with the undoped material. The test was carried out in the same way as in Example 1 in 50 ml glass beakers at 225° C. until gelation occurred. A gel time of 8 to 12 days was determined for the doped material, i.e., the same gel time as for the undoped material.

EXAMPLE 3

Quantities of 0.2% by weight of a trimethylsilyl-terminated polymethyl hydrogen siloxane compound having a viscosity of 15 mm$^2$ s$^{-1}$ at 25° C. were stirred into trimethylsilyl-terminated polydimethyl siloxanes of various viscosities and the gel times determined as in Example 1 by comparison with the undoped samples. The results are shown in Table 3

TABLE 3

| Gel times of polydimethyl siloxanes of different viscosities with additions of polymethyl hydrogen siloxane | | |
|---|---|---|
| Viscosity in mm$^2$ s$^{-1}$ at 25° C. | Gel time without addition in days | Gel time with addition in days |
| 50 | 8–12 | 8–12 |
| 500 | 5–6 | 5–6 |
| 1,000 | 5–6 | 5–6 |
| 5,000 | 5–6 | 4–5 |
| 60,000 | 4–5 | 4–5 |
| 500,000 | 3–4 | 3–4 |

EXAMPLE 4

Quantities of 0.01% by weight of 1-methylamino-4-)3-methylphenylamino)-anthraquinone were dissolved in the trimethylsilyl-terminated polydimethyl siloxanes of Example 3 and the gel times were determined as in Example 1 by comparison with the undoped samples. The results are shown in Table 4.

TABLE 4

| Gel times of polydimethyl siloxanes of different viscosities with additions of 1-methylamino-4-(3-methylphenylamino)-anthraquinone | | |
|---|---|---|
| Viscosity in mm$^2$ s$^{-1}$ at 25° C. | Gel time without addition in days | Gel time with addition in days |
| 50 | 8–12 | 40–48 |
| 500 | 5–6 | 20–22 |
| 1,000 | 5–6 | 20–22 |
| 5,000 | 5–6 | 18–20 |
| 60,000 | 4–5 | 18–20 |

TABLE 4-continued

Gel times of polydimethyl siloxanes of different viscosities with additions of 1-methylamino-4-(3-methylphenylamino)-anthraquinone

| Viscosity in $mm^2 s^{-1}$ at 25° C. | Gel time without addition in days | Gel time with addition in days |
|---|---|---|
| 500,000 | 3-4 | 16-18 |

EXAMPLE 5

Quantities of 0.01% by weight 1-methylamino-4-(3-methylphenylamino)-anthraquinone and 0.2% by weight of a trimethylsilyl-terminated polymethyl hydrogen siloxane compound having a viscosity of 15 $mm^2 s^{-1}$ at 25° C. were dissolved in the trimethylsilyl-terminated polydimethyl siloxanes of Example 4 and the gel times were determined as in Example 1 by comparison with the undoped samples. The results are shown in Table 5.

TABLE 5

Gel times of polydimethyl siloxanes of different viscosities with additions of 1-methylamino-4-(3-methylphenylamino)-anthraquinone and polymethyl hydrogen siloxane

| Viscosity in $mm^2 s^{-1}$ at 25° C. | Gel time without addition in days | Gel time with addition in days |
|---|---|---|
| 50 | 8-12 | 55-60 |
| 500 | 5-6 | 44-48 |
| 1,000 | 5-6 | 44-48 |
| 5,000 | 5-6 | 40-44 |
| 60,000 | 4-5 | 40-44 |
| 500,000 | 3-4 | 40-44 |

EXAMPLE 6

Quantities of 0.01% by weight of anthraquinone compounds nos. 4, 8, 13 and 18 of Example 1 were dissolved in the trimethylsilyl-terminated polydimethyl siloxanes having a viscosity of 60,000 $mm^2 s^{-1}$ at 25° C. which were then tested for oxidation stability as in Example 1 by comparison with polydimethyl siloxane samples having the same viscosity, but additionally containing 0.2% by weight of a trimethylsilyl-terminated polymethyl hydrogen siloxane having a viscosity of 15 $mm^2 s^{-1}$ at 25° C. besides the respective anthraquinone compounds. The results are shown in Table 6.

TABLE 6

Gel times of polydimethyl siloxane containing various anthraquinone compounds by comparison with samples additionally containing a polymethyl hydrogen siloxane.

| With addition of anthraquinone | Gel time (days) |
|---|---|
| No. 4 | 10-12 |
| No. 8 | 10-12 |
| No. 13 | 18-20 |
| No. 18 | 18-20 |
| With addition of anthraquinone and polymethyl hydrogen siloxane | |
| No. 4 | 20-24 |
| No. 8 | 22-26 |
| No. 13 | 40-44 |
| No. 18 | 40-44 |

EXAMPLE 7

To determine whether the combination according to the invention of anthraquinone compound and polymethyl hydrogen siloxane also has a stabilizing effect on other systems than polydimethyl siloxanes, quantities of 0.02% by weight 1-methylamino-4-(3-methylphenylamino)-anthraquinone and 0.2% by weight of a trimethylsilyl-terminated polymethyl hydrogen siloxane were dissolved in the polyorganosiloxanes shown in Table 7, after which 20 g of these samples in 50 ml glass beakers were heated to gelation at 225° C. by comparison with samples containing only the anthraquinone compound and with undoped samples.

TABLE 7

Polyorganosiloxanes used

| | |
|---|---|
| Oil no. 1: | trimethylsilyl-terminated polydimethyl siloxane having a viscosity of 100 $mm^2 s^{-1}$ at 25° C. |
| Oil no. 2: | trimethylsilyl-terminated polymethylethyl siloxane having a viscosity of 50 $mm^2 s^{-1}$ at 25° C. |
| Oil no. 3: | trimethylsilyl-terminated polymethylphenyl siloxane having a viscosity of 200 $mm^2 s^{-1}$ at 25° C. |

The results obtained are shown in Table 8.

TABLE 8

Gel times of various polyorganosiloxanes containing 0.02% by weight 1-methylamino-4-(3-methylphenylamino)-anthraquinone, 0.02% by weight of the same compound + 0.2% by weight of the same compound + 0.2% by weight polymethyl hydrogen siloxane having a viscosity of 15 $mm^2 s^{-1}$ at 25° C. by comparison with undoped material

| | | Gel time (days) |
|---|---|---|
| Oil no. 1 | undoped | 8-10 |
| Oil no. 1 | with anthraquinone comp. | 38-42 |
| Oil no. 1 | with anthraquinone comp. and polymethyl hydrogen siloxane | 52-56 |
| Oil no. 2 | undoped | 2-3 |
| Oil no. 2 | with anthraquinone comp. | 3-4 |
| Oil no. 2 | with anthraquinone comp. and polymethyl hydrogen siloxane | 6-8 |
| Oil no. 3 | undoped | 6-8 |
| Oil no. 3 | with anthraquinone comp. | 10-12 |
| Oil no. 3 | with anthraquinone comp. and polymethyl hydrogen siloxane | 14-16 |

By virtue of their improved heat resistance, the polymethylphenyl siloxanes were tested at 300° C.

EXAMPLE 8

To determine whether the combination according to the invention also has a stabilizing effect against the thermal depolymerization of polyorganosiloxanes, trimethylsilyl-terminated polydimethyl siloxanes of different viscosities were doped with 0.01% by weight 1-methylamino-4-(3-methylphenylamino)-anthraquinone (samples A), with 0.2% of a trimethylsilyl-terminated polymethyl hydrogen siloxane compound having a viscosity of 15 $mm^2 s^{-1}$ at 25° C. (samples B), with 0.01% by weight 1-methylamino-4-(3-methylphenylamino)-anthraquinone and 0.2% by weight of a trimethylsilyl-terminated polymethyl hydrogen siloxane compound having a viscosity of 15 $mm^2 s^{-1}$ at 25° C. (samples C) and compared with the undoped materials (samples D).

Quantities of 30 g of each of the samples were introduced into borosilicate tubes 250 mm long and 20 mm in diameter with a ground-glass attachment. The samples were then repeatedly degassed in vacuo with the aid of a threeway cock and were blanketed with dry nitrogen. With the three-way cock in the closed position, the tubes thus pretreated were heated for 14 days at 225° C. in a heating block and the change in viscosity ultimately determined in by comparison with the unheated samples. The results of this test are shown in Table 9.

TABLE 9

Changes in viscosity of various doped and undoped polydimethyl siloxanes after heating for 14 days at 225° C. in a closed, nitrogen-blanketed system

|  | Starting viscosity in mm$^2$ s$^{-1}$ at 25° C. | Change in viscosity after storage in % |
|---|---|---|
| Samples A | 1,000 | −25 |
|  | 5,000 | −42 |
|  | 60,000 | −75 |
|  | 500,000 | −83 |
| Samples B | 1,000 | −18 |
|  | 5,000 | −43 |
|  | 60,000 | −66 |
|  | 500,000 | −84 |
| Samples C | 1,000 | −8 |
|  | 5,000 | −24 |
|  | 60,000 | −49 |
|  | 500,000 | −52 |
| Samples D | 1,000 | −20 |
|  | 5,000 | −42 |
|  | 60,000 | −75 |
|  | 500,000 | −89 |

Accordingly, both the oxidation stability and heat resistance of polyorganosiloxanes, particularly polydimethyl siloxanes, can be distinctly improved by the addition of the combination according to the invention of anthraquinone compounds and methyl hydrogen siloxanes by comparison with systems containing only one compound from the classes mentioned or no addition at all.

What is claimed is:

1. Polyorganosiloxanes having improved resistance to oxidation and heat, said polyorganosiloxanes containing an effective amount of a mixture of anthraquinone compounds and methyl hydrogen siloxanes.

2. Polyorganosiloxanes according to claim 1, containing from 0.001 to 0.05% by weight of anthraquinone compounds and from 0.05 to 5% by weight of methyl hydrogen siloxanes, based on the total quantity.

3. Polyorganosiloxanes according to claim wherein anthraquinone compounds have the following formula

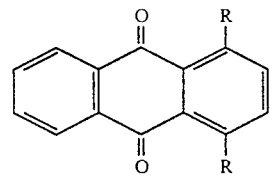

in which the R's independently of one another represent hydrogen, amino or substituted amino groups, and the methyl hydrogen siloxanes are trimethylsilyl-terminated polymethyl hydrogen siloxanes.

4. In a power transmission medium comprising polyorganosiloxanes the improvement wherein the polyorganosiloxanes have improved resistance to oxidation and heat and contain an effective amount of a mixture of anthraquinone compounds and methyl hydrogen siloxanes.

* * * * *

UNITED STATES PATENT AND TRADEMARK OFFICE
CERTIFICATE OF CORRECTION

PATENT NO. : 5,013,858

DATED : May 7, 1991

INVENTOR(S) : Marquardt et al.

It is certified that error appears in the above-identified patent and that said Letters Patent is hereby corrected as shown below:

Col. 8, line 12   After " claim " insert -- 1 --

Signed and Sealed this

Eighteenth Day of May, 1993

Attest:

MICHAEL K. KIRK

Attesting Officer    Acting Commissioner of Patents and Trademarks